Oct. 27, 1931.                R. STRESAU                    1,828,987
                         FEED PREPARING APPARATUS
                      Filed May 15, 1929        3 Sheets-Sheet 1
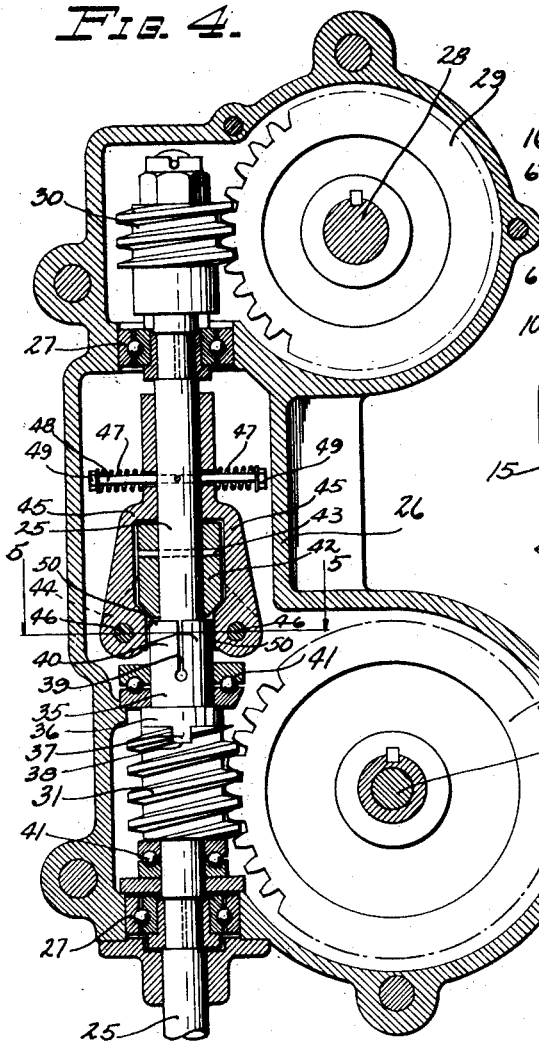
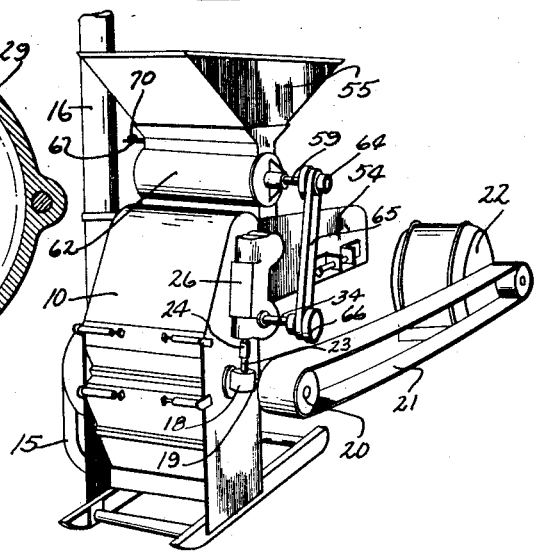
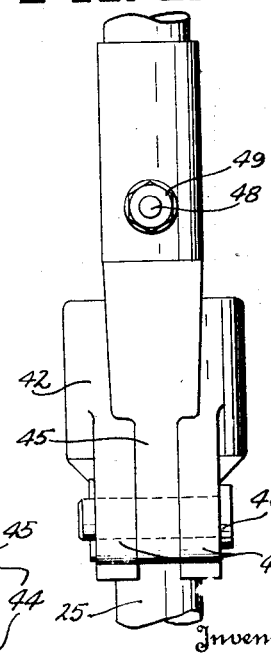
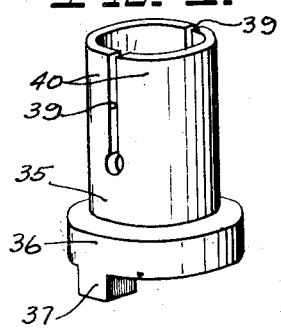
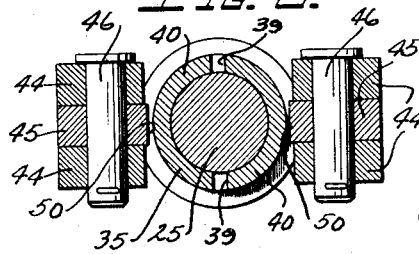
Inventor
Richard Stresau
By Charles & French
Attorneys

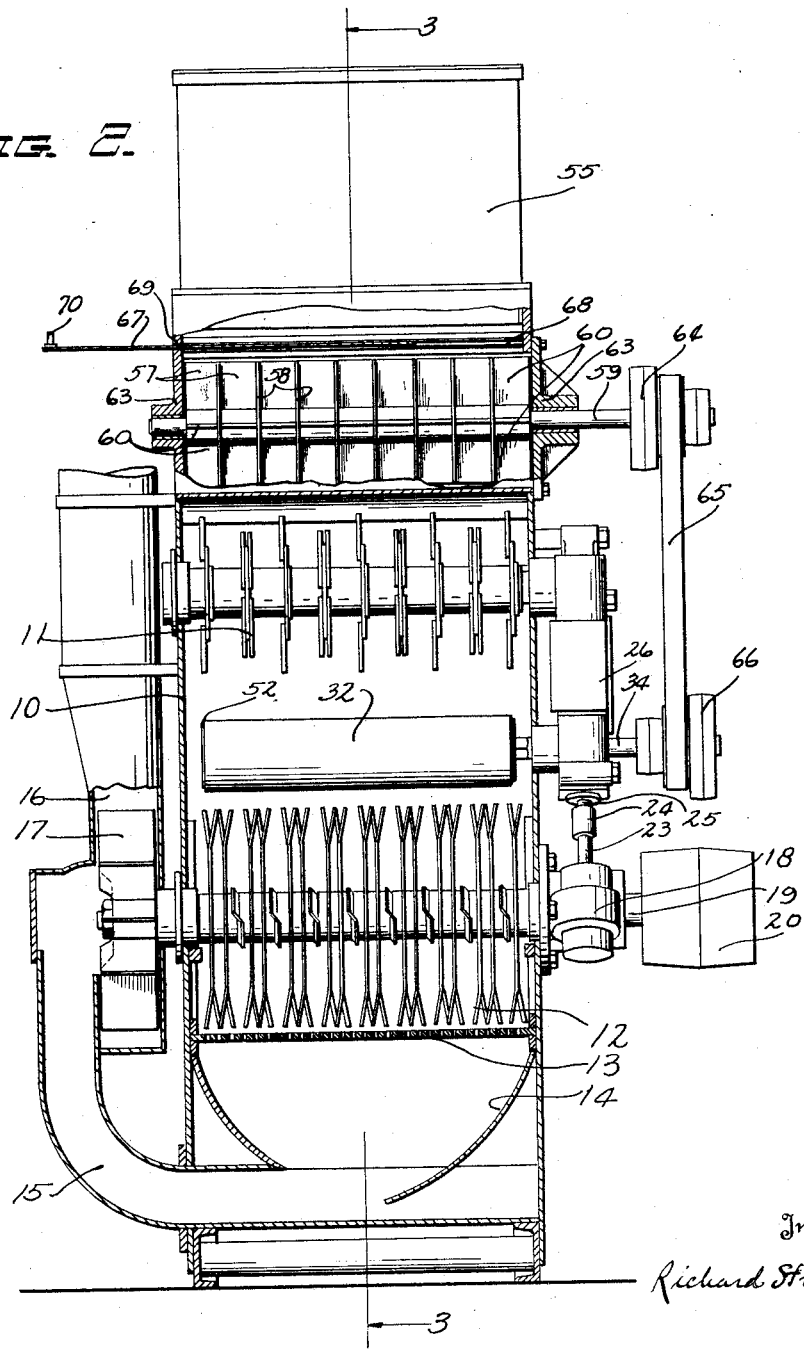

Oct. 27, 1931.  R. STRESAU  1,828,987

FEED PREPARING APPARATUS

Filed May 15, 1929  3 Sheets-Sheet 3

Inventor
Richard Stresau
By
Marles & French
Attorneys

Patented Oct. 27, 1931

1,828,987

UNITED STATES PATENT OFFICE

RICHARD STRESAU, OF WAUWATOSA, WISCONSIN, ASSIGNOR TO SWIFTON MANUFACTURING COMPANY, OF WEST ALLIS, WISCONSIN, A CORPORATION OF WISCONSIN

FEED-PREPARING APPARATUS

Application filed May 15, 1929. Serial No. 363,277.

The invention relates to feed mills.

In feed mills for cutting fodder or grinding grain it is sometimes desirable to provide a mixed feed of fodder and grain and the object of the present invention is to provide, in connection with the usual feed mill, mechanism for feeding grain thereto in the desired amount simultaneously with the fodder and to insure the stoppage of the feed of grain thereto in the event of the clogging of the machine and the stoppage of the feed of the fodder.

The invention further consists in the several features hereinafter set forth and more particularly defined by claims at the conclusion hereof.

In the drawings Fig. 1 is a perspective view of apparatus embodying the invention;

Fig. 2 is a view generally in section taken along the line 2—2 of Fig. 3;

Fig. 4 is a detail sectional view through a portion of the drive mechanism;

Fig. 5 is a detail sectional view taken on the line 5—5 of Fig. 4;

Fig. 6 is a detail side elevation view of the governor assembly;

Fig. 7 is a perspective view of the feed clutch member.

Figure 3:
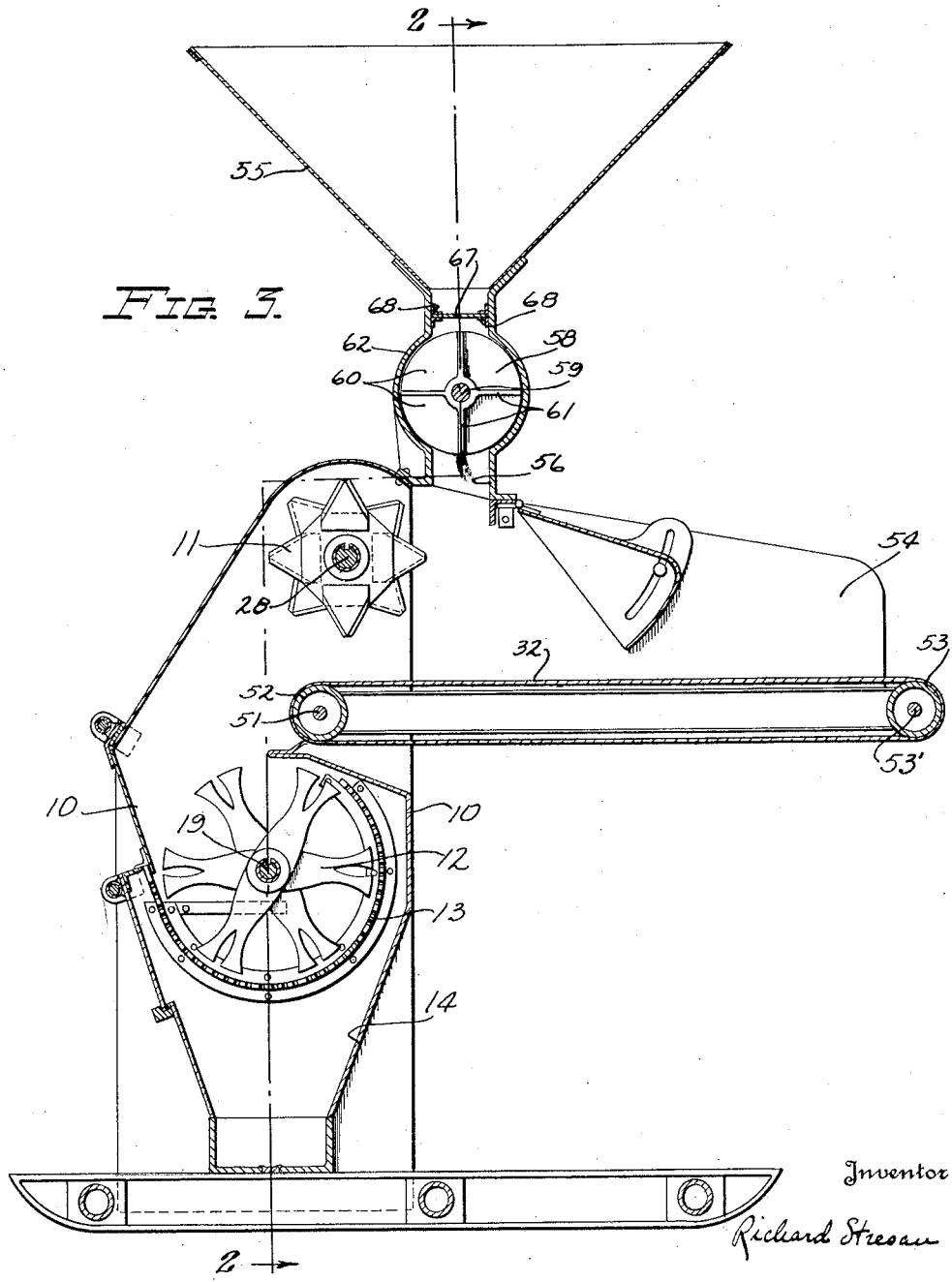
Fig. 3 is a sectional view taken along the line 3—3 of Fig. 2.

While the grain feeding mechanism and control mechanism therefor may be used in connection with any feed mill capable of handling grain and fodder, it is here shown as applied to a feed mill more particularly illustrated and described in my copending application Serial No. 344,018, filed March 2, 1929, and so much of which is shown here as will enable those skilled in the art to understand the present invention.

The feed mill, in brief, includes a casing 10 having a cutter 11 and beater or grinder 12 journalled therein, the beater being associated with a screen 13 below which is a discharge hopper 14 connected by a conduit 15 to a discharge conduit 16 at the lower end of which a suction fan 17 is located and driven from the beater shaft which, through suitable gearing within a housing 18, is driven from a shaft 19 carrying a pulley 20, which may be connected by belt 21 to any suitable source of power, as for example the electric motor 22.

The gearing within the housing 18 connects with a shaft 23 having a coupling 24 securing it to a shaft 25 which extends through a housing 26 and is suitably supported and mounted in ball bearing journals 27 and is driven continuously while the machine is in operation, whereby the shaft 28 for the cutter which carries a worm wheel 29 meshing with a worm 30 on the shaft 25 is driven continuously. A worm gear 31, for driving the endless conveyor 32 through worm wheel 33 and shaft 34 is, however, loose on the shaft 25 and adapted to be connected thereto when the cutters reach the desired working speed by means of a governor-operated clutch.

This clutch includes a tubular member 35 having a collar portion 36 provided with diametrically disposed keys 37 engaging in key slots 38 in the gear 31 and a tubular portion provided with slots 39 and forming yieldable clutch sections 40. This member 35 and the worm 31 are mounted on the shaft 25 between journals 41.

An inertia governor or speed-responsive device includes a spider whose hub 42 is secured to the shaft 25 by a pin 43 and whose diametrically disposed spaced arms 44 have the governor weight arms 45 mounted therebetween on pins 46. Tensioning springs 47 for the arms 45 are mounted on a rod 48 pinned to the shaft 25 and interposed between said arms and an adjusting nut 49. At their lower ends the arms 45 have faces 50 which, as said arms swing out under the action of centrifugal force, are adapted to engage and press inwardly on the yieldable sections 40 of the clutch member 35 and thus cause it to be clamped to the shaft 25, and thence, through the key connection 37, 38, drive the worm 31 which in turn drives the conveyor, including a shaft 51 carrying a roller structure 52 over which the conveyor 32 runs, a similar roller structure 53 mounted on a shaft 53′ forming the other support for the conveyor which is suitably mounted on the machine between side chute plates 54.

With this construction the cutter and grinder rotate continuously, but in the event that the material operated on by the cutter tends to clog the same or reduce its speed and that of shaft 25 below a certain predetermined, efficient cutting speed the governor arms 45 move free of the clutch member 35 and thus release it from driven engagement with the shaft 25 and thus release the worm 30 from driven connection with said shaft and hence the conveyor apparatus driven thereby to stop the feed of material by the conveyor until the machine again reaches the desired working speed, at which time the governor acts to throw in the feeding drive, as above described.

For feeding grain into the machine along with the fodder, I provide a hopper 55 and a measuring discharge mechanism associated therewith. This mechanism includes a delivery valve structure at the outlet end of the hopper for controlling the flow of grain through a conduit 56 to the conveyor adjacent the cutter 11. This valve structure includes a plurality of compartments 57 formed between spaced disks 58 mounted on a shaft 59, said compartments being divided into a plurality of radially disposed pockets 60 formed by the fan-like blade members 61 secured to said shaft between said disks which fit closely within a cylindrical casing 62 supporting the hopper. The shaft 59 is journalled in end plates 63 of the casing 62 and carries a pulley or preferably a multi-cone pulley 64 which is connected by a shiftable belt 65 with a similar cone pulley 66 mounted on an extension of the conveyor drive shaft 34 so that it will be observed that as long as the conveyor shaft is driven to feed fodder to the cutter 11 the shaft 59 and hence the discharge valve structure associated therewith will be driven to discharge grain from the hopper 55 on the conveyor 32, but if for any reason the conveyor feed is stopped, as previously described, the drive of the shaft 59 is also stopped to prevent further feed of grain. Thus the proportion of grain to fodder once established is always maintained.

In order to vary the ratio of grain to fodder, a slide plate or shutter 67 is mounted in guideway 68 above the rotary valve and extends through a slot 69 in the casing 62 and has a handle 70 thereon whereby said plate may be moved inwardly or outwardly within the casing, thereby exposing a less or greater number of the discharge compartments 57 to the flow of grain from the hopper and thus control the relative proportion of grain to fodder in the feed mixture. To further regulate these proportions the speed of the shaft 57 may be varied by shifting the belt 65 to different sets of the cone pulleys 64 and 66.

Thus as the fodder is fed by the conveyor 32 into the machine and to the cutter 11 the grain from the hopper 55 is discharged into the fodder in the desired measured amount and proceeds therewith into the machine. Thereafter the fodder is cut into short lengths by the cutter 11 and both grain and fodder drop down into the path of the beater 12 where they are thoroughly broken up and discharged through the screen 13 and under the action of suction from the fan 17 are taken up into the stack or conduit 16 and conveyed to receptacles or a suitable place of storage.

I desire it to be understood that this invention is not to be limited to any particular form or arrangement of parts except insofar as such limitations are included in the claims.

What I claim as my invention is:

1. In a feed mill, the combination with a cutter, of means for feeding fodder thereto, means for feeding grain to the machine to mix with the fodder, means for automatically stopping the feed of fodder to the cutter when the same falls below a certain predetermined speed, and means for simultaneously stopping the feeding of grain on the automatic stoppage of said fodder-feeding means.

2. In a feed mill, the combination with a cutter, of means for feeding fodder thereto, means controlled by the speed of the cutter for stopping said fodder-feeding means, means for feeding grain to the machine to mix with the fodder, said grain-feeding means being connected with the drive of the cutter and controlled thereby to stop the feed of grain to the machine when the fodder-feeding means is stopped.

In testimony whereof, I affix my signature.

RICHARD STRESAU.